US005276609A

United States Patent [19]

Durlach

[11] Patent Number: 5,276,609

[45] Date of Patent: Jan. 4, 1994

[54] 3-D AMUSEMENT AND DISPLAY DEVICE

[76] Inventor: David M. Durlach, 77 Porter St., #9, Somerville, Mass. 02143

[21] Appl. No.: 706,560

[22] Filed: May 28, 1991

Related U.S. Application Data

[63] Continuation of Ser. No. 439,771, Nov. 20, 1989, abandoned.

[51] Int. Cl.[5] .................... G06F 15/28; A63B 67/00

[52] U.S. Cl. .................................... 364/410

[58] Field of Search .................... 364/410, 522, 521; 358/88, 89, 90; 340/729, 795; 350/130, 131; 40/449, 406, 439, 426, 446, 447; 273/1; 446/268

[56] References Cited

U.S. PATENT DOCUMENTS

| | | | |
|---|---|---|---|
| 3,636,551 | 1/1972 | Maguire | 358/88 |
| 4,030,736 | 6/1977 | Petrusek | 273/345 |
| 4,094,464 | 6/1978 | Kawamura et al. | 40/449 |
| 4,111,363 | 9/1978 | Kawamura et al. | 40/449 |
| 4,160,973 | 7/1979 | Berlin, Jr. | 358/88 |
| 4,167,019 | 9/1979 | Shepperd | 358/22 |
| 4,211,411 | 7/1980 | McDaniel et al. | 273/1 M |
| 4,293,133 | 10/1981 | Baron et al. | 273/345 |
| 4,294,406 | 10/1981 | Pevnick . | |
| 4,414,775 | 11/1983 | Jensen | 446/129 |
| 4,484,219 | 11/1984 | Kirk | 358/90 |
| 4,525,711 | 6/1985 | Gery | 340/795 |
| 4,536,428 | 8/1985 | Murata et al. | 40/449 |
| 4,566,210 | 1/1986 | Winrow et al. | 40/449 |
| 4,831,372 | 5/1989 | Riddoch | 40/449 |
| 4,870,485 | 9/1989 | Downing et al. | 358/90 |
| 4,892,250 | 1/1990 | Fuller et al. | 40/406 |
| 4,896,150 | 1/1990 | Brotz | 340/795 |
| 4,902,011 | 2/1990 | Seaton | 446/129 |
| 4,923,429 | 5/1990 | Lewis | 40/406 |
| 4,939,859 | 7/1990 | Bradt | 40/406 |
| 4,991,836 | 2/1991 | Joffe | 446/129 |

OTHER PUBLICATIONS

Federal Fountain Inc., Brochure entitled "Water Message Panel", Spring of 1993.

"The Exploratorium" Information Letter, San Francisco, California, Magnetic Field Patterns by Heather McGill and Stan Axelrod (1983), p. 6.

Newsletter from David Durlach, "Our Times" broadcast Dec. 17, 1988.

"Beans about Boston" in *The Boston Ledger*, vol. 51, No. 49, Dec. 9–15, 1988.

*The Boston Globe*, "Our Towne" by Jack Thomas, Jan. 9, 1989.

*The Boston Globe*, "Calendar", vol. 14, No. 18, Jan. 19, 1989, p. 16.

*The Boston Globe Magazine*, "The Cutting Edge: Viewer Friendly", Feb. 5, 1989, p. 70.

"Wonderland of Science Art–Invitation to Interactive Art", Symposium and Performance in Tokyo, Japan, Nov. 10, 1989, pp. 28–29.

*Primary Examiner*—Roy N. Envall, Jr.
*Assistant Examiner*—Xuong M. Chung
*Attorney, Agent, or Firm*—Hamilton, Brook, Smith & Reynolds

[57] ABSTRACT

A device provides temporal and spatial 3-D patterns with a plurality of elements. The shape, position and orientation of the elements are controlled by a computer. The medium in which the elements lie provide movement of the elements without effects of vibration or turbulence. In a particular medium elements movements are dampened such that a quick change in position and/or orientation of an element is without apparent vibration. The medium and elements are of respective materials such that noise is eliminated. Iron powder elements on a surface are repositionable and reorientable in a desired temporal and spatial pattern through computer controlled changes to a generated magnetic field. Different sized bubbles are generated in a desired temporal and spatial pattern in a tank of glycerin through computer controlled air valves. The computer control is preprogrammed or in response to user operation of an input device.

22 Claims, 3 Drawing Sheets

3-D AMUSEMENT AND DISPLAY DEVICE

This is a continuation of co-pending application Ser. No. 07/439,771 filed on Nov. 20, 1989 now abandoned.

BACKGROUND

Various amusement and display devices exist. Of the amusement/display devices which provide a visual effect, many do not provide a 3-D display of elements. For example, graphical display devices generally operate in a 2-D plane.

Of interest are those devices which provide displays that are visually intriguing. Examples are the devices which form patterns from iron filaments. However, these devices typically provide a physically two-dimensional display.

Other examples are the devices which form patterns from gas and liquid elements, such as air and water. A particular example is a fountain. Although these devices form patterns in 3-D, they are generally very noisy and bulky.

Accordingly, there is a need for an amusement/display device which provides 3-D displays in a space conscious and relatively quiet manner, yet is visually intriguing.

SUMMARY OF THE INVENTION

The present invention provides a multiplicity of elements which form a desired time series of physically three-dimensional arrangements, in a working medium, through computer means. In particular, the computer means changes state of a 3-D arrangement of elements in the working medium according to a desired time sequence of state changes. As a result, number, position and orientation of the elements change in the working medium according to a temporal and spatial pattern.

According to one aspect of the present invention, the elements and medium are formed of respective materials which enable the elements to change position and/or orientation without producing noise and without apparent effects due to vibration or turbulence in the working medium.

According to another aspect of the present invention, the temporal and spatial pattern is established according to user operation of an input device which is coupled to the computer means. Alternatively a specification of the series of 3-D arrangements of elements is stored (programmed) in the computer means.

In one embodiment of the present invention, the elements comprise iron and the working medium is a magnetic field about a working surface. The iron elements lie on the surface and change position and orientation according to change in the magnetic field. The magnetic field is formed by a first working magnetic field generated by a permanent magnet and a second working magnetic field generated by one or more controllable electromagnets coupled to the computer means. The second working magnetic field is controllably changed by the computer means and in turn perturbs the first working magnetic field generated by the permanent magnet. The controllable changing of the magnetic field through the computer means repositions and reorients the iron elements according to a desired temporal and spatial pattern.

Preferably, the elements are able to quickly change position and orientation in the medium without side effects such as vibration. Preferably, response time of the elements is about 1/30 second to about ¼ second.

In addition, a computer routine executable by the computer means substantially evenly distributes the elements on the working surface.

In another embodiment of the present invention, the elements are air bubbles, and the medium is a volume of glycerine in a closed container. Other liquids in which air bubbles travel a substantially straight path independent of turbulence are also suitable. Preferably, the air bubbles are generated through valves which deliver air into the container from a source of pressurized air. The valves are in number and arrangement such that various shapes and patterns are formed by bubbles released through the valves as the valves are controlled by the computer means. Also the valves are controlled by the computer means such that air bubbles of different sizes are generated as desired.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1A:
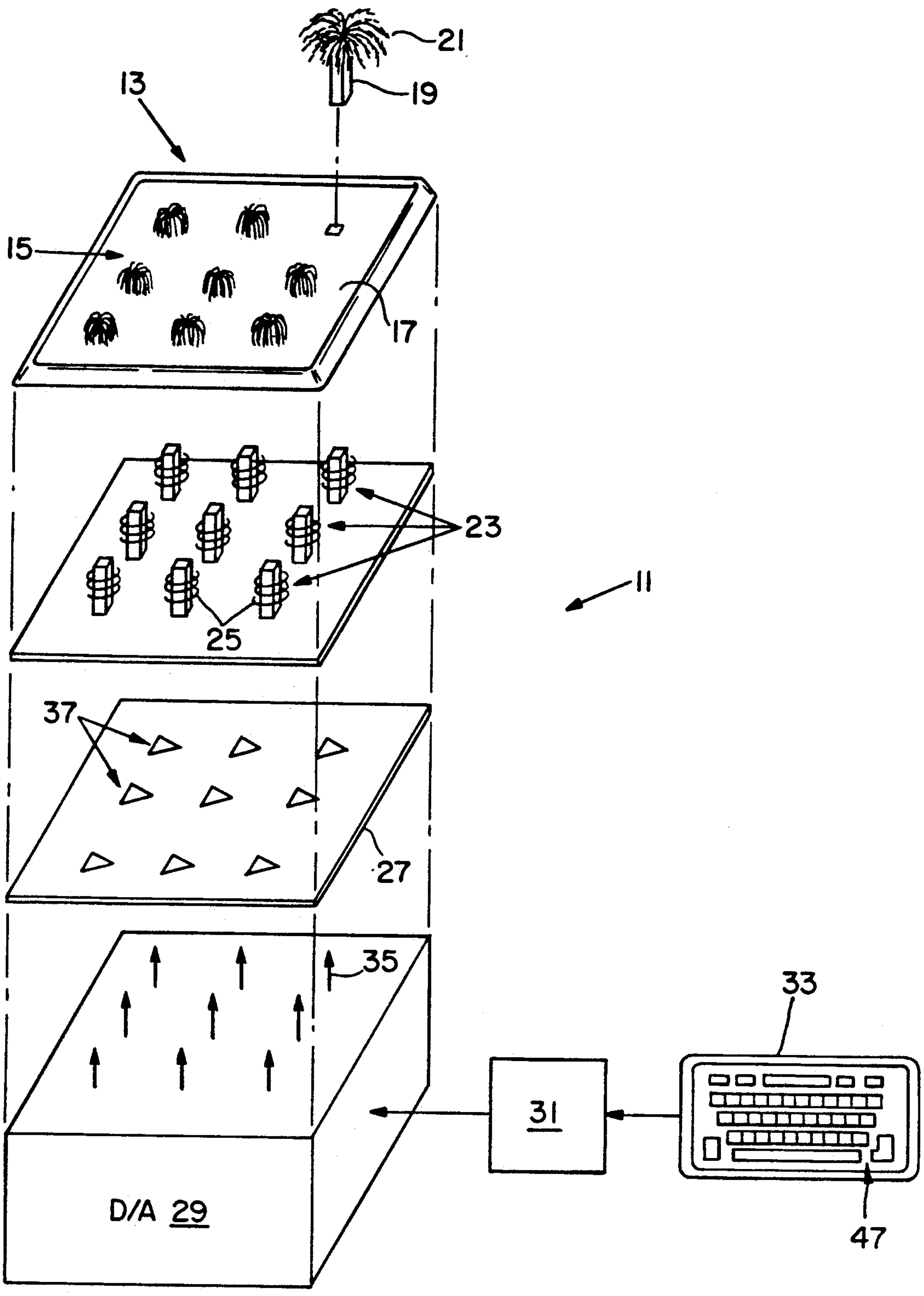
FIG. 1*a* is a schematic view, partially exploded, of one preferred embodiment of the present invention.

Illustrated in FIG. 1*a* is a 3-D amusement and display device 11 embodying the present invention. The device 11 provides a display assembly 13 in which an array of iron elements 15 on a support surface 17 change shape in a computer controlled magnetic field. In particular the iron elements 15 change position and orientation with respect to the support surface 17 in accordance with a desired temporal and spatial pattern. The pattern is preprogrammed in computer 31 or input to the computer 31 through an input device 33. In the latter case, the iron elements 15 respond during operation of the input device 33 to provide user interaction with the array of iron elements.

The display assembly 13 is formed by an arrangement of permanent magnets 19 on support surface 17, for example a 9×9 rectangular array of 81 permanent cast Alnico 5 rods (1.25 inch in length by ¼ inch in diameter and magnetized axially). Permanent magnets of the type commonly used in domestic applications are suitable. Each permanent magnet 19 is mounted by epoxy or the like onto support surface 17 with its axis in a direction perpendicular to the surface. A tray or other surface surrounded by walls is preferred for support surface 17.

The permanent magnets 19 and surface 17 are covered with an iron powder 21 such that iron mound-like members (iron elements 15) are formed at the permanent magnets 19. More specifically, the iron powder 21 is very fine in consistency, like flour, and is attracted to the permanent magnets 19. The iron powder 21 clings to the permanent magnets 19 and forms a fur-like coating which is reshapeable with changes to the magnetic field generated by the permanent magnets 19, discussed later.

Underneath the support surface 17 lies an array of electromagnets 23. In a conceptually simple embodiment, there is one electromagnet 23 for each permanent magnet 19. Each corresponding electromagnet 23 is aligned under its respective permanent magnet 19. However, decreasing or increasing the relative number of electromagnets 23 to permanent magnets 19 results in manufacturing and visual, respectively, advantages. The orientation of each electromagnet 23 is typically with its axis in a direction perpendicular to the surface 17. However other orientations are suitable.

Preferably, each electromagnet 23 has a circular cross section bobbin, core diameter 1.187 inch, length 2.375 inch, flange diameter 2.5 inch, and wall thickness 0.047 inch. Through the center of the bobbin lies a 2.75 inch long cold rolled 1018 steel rod about 1.187 inch in diameter. The bobbin is wound with a coil 25 formed of about 1000 turns of insulated 19 gauge copper wire.

A bipolar computer controllable voltage in the range of about −8 volts to about +8 volts is applied to the coils 25 of desired electromagnets 23 through an electronic assembly (described later) of the device 11. The applied voltage causes involved electromagnets 23 to generate a magnetic field which perturbs the static magnetic field of corresponding permanent magnets 19. In turn, the iron powder 21 which covers the corresponding permanent magnets 19 changes position and/or orientation in response to the change in the surrounding magnetic field.

Figure 1B:
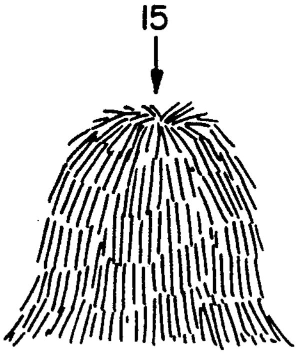
FIGS. 1*b* through 1*d* are side views of an iron element in different states in the embodiment of FIG. 1*a*.
Figure 1C:
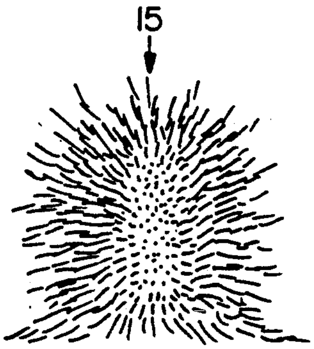
Figure 1D:

Specifically, in response to about 0 volts applied to electromagnet 23 of a corresponding permanent magnet 19, the iron powder 21 lies on magnet 19 in a relaxed manner as illustrated in FIG. 1*b*. In response to applied voltage closer to the high end of the ±8 volt range, the iron powder 21 stiffly protrudes from permanent magnet 19 in a manner illustrated in FIG. 1*c*. In response to applied voltage closer to the lower end of the ±8 volt range, the iron powder 21 clings tightly to the permanent magnet 19 as shown in FIG. 1*d*. Response of the iron powder 21 to applied voltages between 0 volts and the extremes (−8 v, +8 v) of the voltage range is understood to be positions between the tightly clinging and stiffly protruding positions of FIGS. 1*c* and 1*d*. It is noted, the orientation of windings of the electromagnet coils 25 determine whether higher applied voltages cause the iron powder 21 to closely cling to the corresponding permanent magnet 19 or to stiffly extend therefrom.

The effect or appearance produced by the foregoing responses of the iron powder 21 is a reshaping or "moving" of the affected iron mound-like members 15. To that end, a desired spatial and temporal pattern of change in voltage applied to the electromagnets produces a series of 3-D arrangements of the mound-like members 15.

It is noted that the foregoing visual effects or appearance of the mound-like elements 15 individually and in combination is made possible in part by the quick response time of the iron powder 21 to the changes in surrounding magnetic field (i.e. the static magnetic field of the permanent magnets 19 plus the changing magnetic field of the computer driven electromagnets 23). Preferably, the response time of the iron members 15 is between about 1/30 second and ¼ second. The powder consistency enables particularly fluid motion or movement with change in magnetic field. Further, the iron powder 21 moves without generating audible noise. Hence, the 3-D amusement and display device 11 provides an unobtrusive display which is appreciable for its physically 3-D features.

The electronic assembly of the device 11 includes amplifier circuit board 27, coupled to digital to analog converter board 29, coupled to computer 31. The computer 31 is a single task processor of the PC or similar type; however multi-task processors and the like are suitable. The computer 31 constantly transmits digital signals to the digital to analog converter board 29 through a computer bus interface, Centronics compatible parallel port, or the like.

The digital to analog converter 29 receives from the computer 31 the computer digital signals and converts them into a constant stream of voltage signals in the range −5 volts to +5 volts. Any of the commonly available or custom made digital to analog I/O boards designed for interface of computer to analog devices is suitable. In one embodiment three 6-channel PC/AT compatible analog output boards manufactured by MetraByte Corporation are employed. In any event, the signals are processed for each of a plurality of analog channels 35, there being an analog channel for each electromagnet 23 in the display assembly 13.

Figure 2:
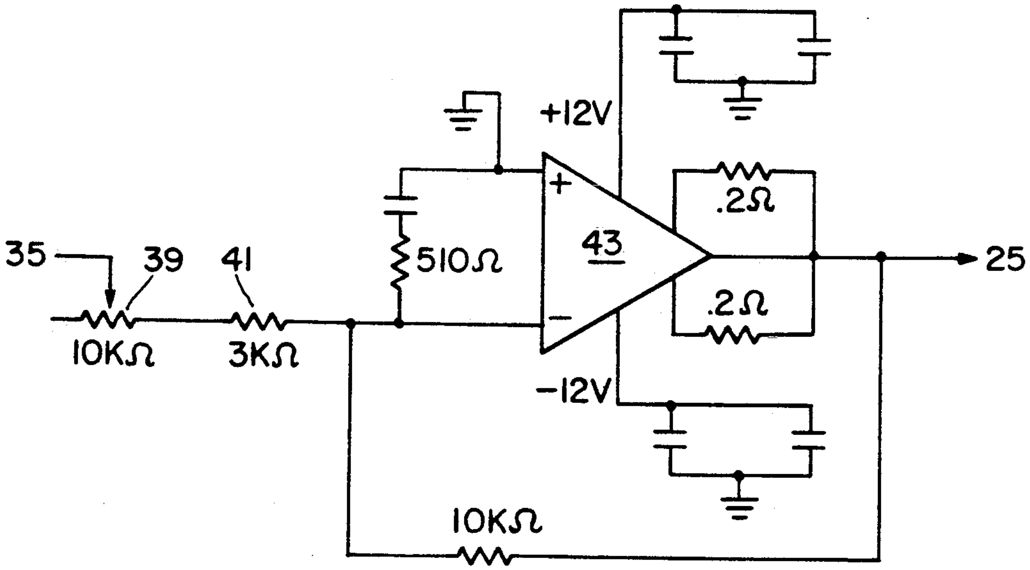
FIG. 2 is a diagram of an electrical circuit employed in the embodiment of FIG. 1.

The circuit board 27 of amplifiers 37 receives the analog signals. The circuit board 27 provides one amplifier 37 per electromagnet 23, and each analog channel 35 from the digital to analog converter board 29 drives one amplifier 37 of amplifier circuit board 27. Each amplifier 37 being the same, only one such amplifier is illustrated in FIG. 2. Amplifiers (op amps) and circuit boards thereof having other configurations are understood to be suitable.

Referring to FIG. 2, the analog signal in the ±5 volt range is received at 10 kohm trim potentiometer 39 which enables adjustment of voltage swing. The adjusted voltage passes through a 3 kohm resistor and is amplified by op amp 43. The resulting voltage is passed to a respective electromagnet coil 25. Additional capacitor elements are included to absorb stray, unwanted current in the circuit.

As mentioned above, the computer 31 may execute a preestablished program for changing voltage drive of one or more of the electromagnets 23 as desired. In a preferred embodiment the program employs a data structure which specifies timing and order of various analog waveforms. During run time (execution) of the program, analog voltage signals which follow the pattern of waveforms specified in the data structure are generated through the analog channels 35 and ultimately drive the electromagnets 25 of display assembly 13. In a preferred embodiment, the program employed is the "Real Time Waveform Editor" copyrighted by David Durlach, 1989, herein incorporated by reference. Other such suitable programs are in the purview of one skilled in the art with the understanding that increases/decreases in voltage signals produce greater clinging/greater protrusion of the iron powder 21, and that there is a direct correspondence between the driven (computer controlled) electromagnets 23 and the permanent magnets 19 or groups thereof carrying the iron powder to form the iron elements 15.

Optionally, the changing voltage drive of the electromagnets 23 may be controlled through an input device 33 coupled to computer 31. One such input device 33 employs a 4×4 grid of force sensitive resistors 45 such as those manufactured by Interlink Electronics and illustrated in FIG. 3. The resistors 45 serve as sensing pads of the input device 33. A plastic sheet with semi-spherical rubber pads affixed to it covers the grid of pressure sensing pads 45, the convex side of each rubber pad pointing down and centered over a respective pressure sensing pad 45. The plastic sheet and semi-spherical pads distribute over the pressure sensing pads 45 the force applied by a user to the upper planar side 47 (FIG. 1*a*) of the semi-spherical rubber pads. Thus pressing down in an area between four adjacent sensing pads 45 will cause equal activation of all four pads.

Figure 3:
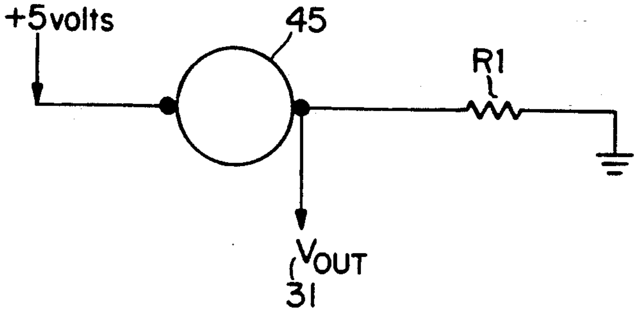
FIG. 3 is a diagram of an electrical circuit optionally employed in the embodiment of FIG. 1.

Referring to FIG. 3, the resistor R1 has a resistance equal to resistance of pressure sensing pad 45 when mid-range pressure is applied.

In a preferred embodiment, the spacing of the sensing pads 45 is about 1 inch. The sensing area of each sensing pad is a circle about ½ inch in diameter. The semi-spherical rubber pads are about 0.375 inch in diameter.

Each of the pressure sensing resistors 45 (FIG. 3) is connected in a circuit such that an output voltage is generated with the voltage changing monotonically as a function of applied pressure. This voltage can then be read by the computer 31 via a wide selection of available analog/digital I/O boards (for example, DATA Translation DT2821 16-channel analog input board) to drive an analog channel 35 or set thereof. Hence, different pressure sensing pads 45 drive different electromagnets 23, strength of the generated electromagnetic field being determined as a function of sensed pressure.

With such an input device 33, a user is able to interact with the mound-like members 15. To that end, the user controls repositioning and reorientation of each mound-like member 15 in a desired temporal and spatial pattern according to operation of the input device 33.

In addition, redistribution of iron powder 21 among the permanent magnets 19 is accomplished through a software routine executed by computer 31. The software routine employs a counter which increments for each particular sequence of output voltage signals to the electromagnets 25. For each increment, the counter addresses (readdresses) the electromagnets 25 such that addressing of the electromagnets 25 is rotated, for example 90°. To that end, the electromagnets are driven on a rotating address basis (e.g. 90° changes at a time), and iron powder 21 on affected corresponding permanent magnets 19 is maintained substantially evenly distributed over surface 17.

Figure 4:
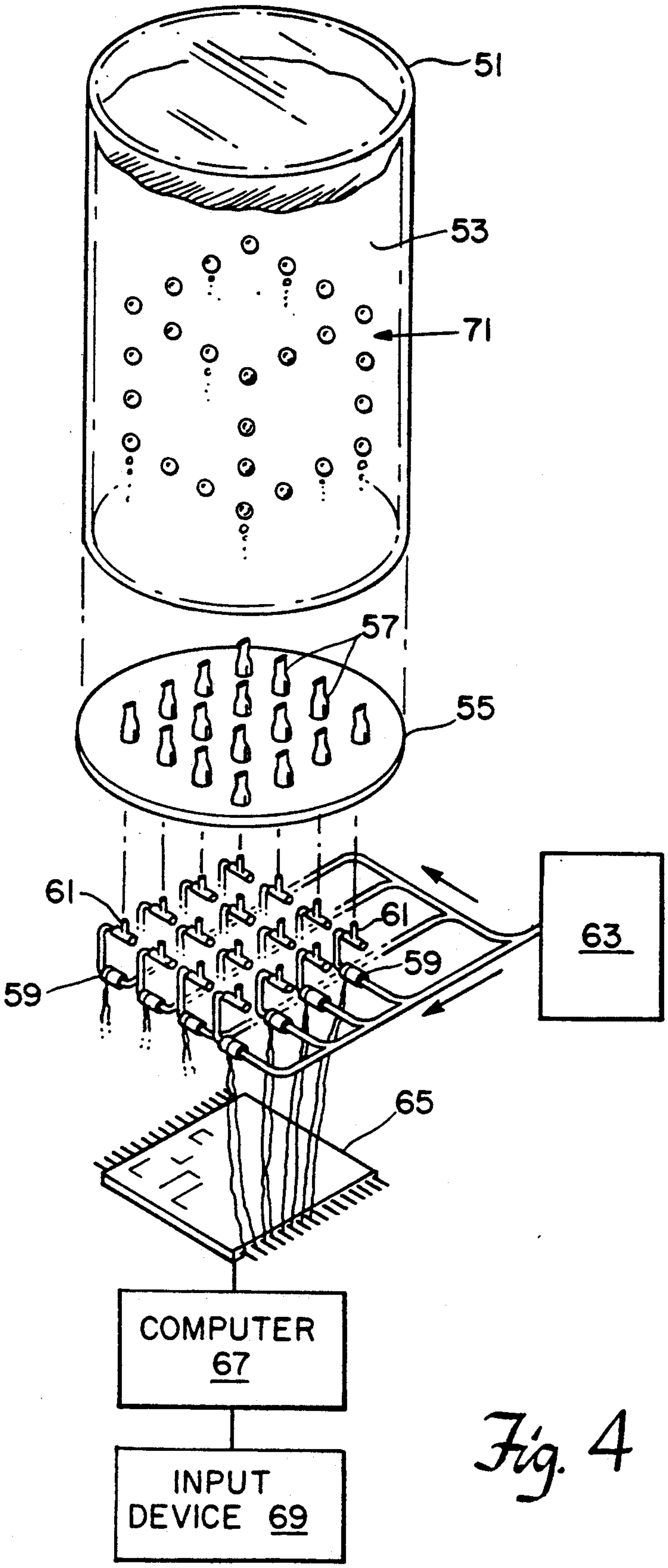
FIG. 4 is a schematic view, partially exploded, of another embodiment of the present invention.

FIG. 4 provides an illustration of another embodiment of the present invention. This embodiment provides a bubble device formed as follows. A tank 51 of glycerin 53 has a base 55 in which is mounted a grid, for example 16×16, of tiny rubber duck billed check valves 57 (256 valves total). Each check valve 57 protrudes directly into the glycerin. Connected to each of the check valves 57 is a respective three way fast response (5–10 ms) low power electrically controlled air valve 59, such as the type manufactured by Clippard. For each air valve 59, in series connection between the electrically controlled air valve 59 and the respective check valve 57, there is a very fine needle valve 61 which adjusts the orifice of the air valve 59. The needle valves 61 ensure that each air valve 59 creates the same size air bubble with the same time width pulse. Air is provided to the air valves 59 from a pressured air reservoir 63 (e.g. 100 psi).

A computer 67 is coupled to each of the air valves 59 via a 256 channel digital I/O board 65. The board 65 has a latching feature such that the state of all 256 air valves 59 is written to the board 65, and with a single bit toggle, all 256 channels/bits of information are latched to the output such that all 256 valves 59 change state simultaneously. Thus under control by computer 67, air valves 59 generate air bubbles 71 in tank 51.

Size of a bubble depends on the length of time an air valve 59 is left open. And the rate at which the bubble floats up through the glycerin 53 depends on the size of the bubble. Thus, through the computer 67 different sized bubbles 71 travelling at different rates in the glycerin are created. More importantly, through the computer 67 one controls which air valves 59 are making bubbles and which valves 59 are not, and in what time sequence. Thus through the computer driven control of the air valves 59 one creates a variety of spatial and temporal patterns of bubbles 71 in the tank of glycerin 53.

To achieve desired patterns of bubbles 71, the computer 67 executes a preestablished program which specifies the sequence of opening and closing of the different air valves 59 (including the length of time each valve 59 is to stay in an open or closed state). Such a program is in the purview of one skilled in the art for generating bubble patterns of, for example, a cube within a cube, letters/numbers, etc.

Alternatively a keyboard or other input device 69 may be coupled to the computer 67. In response to user operation of the input device 69, the computer changes states of the air valves 59. To that end, bubbles 71 and patterns of bubbles are created as the user operates the input device 69. Hence the user interacts with the bubble device for a real time manner of operation.

It is understood that media other than glycerin are suitable as long as the medium allows control of the bubbles paths free of turbulent effect. Also gases other than air are suitable for forming the bubbles. The medium and bubbles are preferably formed of materials which eliminate (do not produce) noise during operation of the device.

While the invention has been particularly shown and described with reference to preferred embodiments thereof, it will be understood by those skilled in the art that various changes in form and details may be made therein without departing from the spirit and scope of the invention as defined by the appended claims. For example, in the bubble device different mutually immiscible fluids of different colors may be employed to form the working fluid. Also, (computer controlled) colored lights illuminating the working fluid may be employed. Direction of flow of the bubbles may be up or down in a the container of working fluid depending on the relative density of the bubble material and the working fluid. Color of bubble material may differ from color of the working fluid.

I claim:

1. A 3-D amusement and display device comprising:

a working medium formed of a region of 3-dimensional space, the working medium physically having three dimensions and including:

(i) a working surface, (ii) a first working magnetic field generated by a permanent magnet adjacent the working surface, and (iii) a second working magnetic field selectively generated by at least one electromagnet adjacent the working surface and controlled by the computer means;

a multiplicity of repositionable elements comprising magnetic material which protrudes from and lies on the working surface, the repositionable elements positioned on the working surface along three dimensions of the working surface, the elements being repositionable on the working surface for forming physical three dimensional arrangements of the elements on the working surface; and computer means coupled to the electromagnet for providing signals for creating a temporal and spatial series of physical 3-dimensional arrangements of the elements on the working surface, the temporal and spatial series being the change of at least one of position and shape of elements on the working surface from one physical 3-D arrangement to another physical 3-D arrangement in a desired time sequence, the temporal and spatial series of physical 3-dimensional arrangements of elements being formed on the working surface and includes various geometrical shapes, the computer means being coupled to the electromagnet for selectively generating the second working magnetic field, and the computer means changing position and orientation of the elements on the working surface by perturbing the first working magnetic field with the second working magnetic field, the computer means controlling strength of the second working magnetic field.

2. A device as claimed in claim 1 further comprising:

a computer routine executable by the computer means for substantially equally distributing the elements over the working surface.

3. A device as claimed in claim 1 wherein each element is able to quickly change position and orientation in the working medium without apparent vibration.

4. A device as claimed in claim 1 wherein the elements change position and orientation in a response time of about 1/30 second to about ¼ second.

5. A 3-D amusement and display device comprising:

a working medium formed of a region of 3-dimensional space, the working medium physically having three-dimensions and including a volume of liquid contained in a container;

a multiplicity of repositionable elements comprising gas bubbles positioned in the working medium along 3-dimensions of the working medium, the gas bubbles being repositionable in the working medium for forming physical 3-dimensional arrangements of the gas bubbles in the working medium;

computer means coupled to the working medium, for providing signals for creating a temporal and spatial series of physical 3-dimensional elements in the working medium, the temporal and spatial series being the change of at least one of position and shape of gas bubbles in the working medium from one physical 3-D arrangement to another physical 3-D arrangement in a desired time sequence, the temporal and spatial series of physical 3-dimensional arrangements of the gas bubbles being formed in the working medium and includes various geometrical shapes, such that the gas bubbles are generated in the container in a temporal and spatial pattern through the computer means as desired, wherein each gas bubble travels a substantially straight path independent of apparent turbulence.

6. A device as claimed in claim 5 further comprising:

a source of pressurized gas; and a plurality of valves for delivering gas from the source into the container, each valve being controlled by the computer means for generating gas bubbles of different sizes.

7. A 3-D amusement and display device comprising:

(a) a working surface;

(b) a plurality of iron elements positioned on and protruding from the working surface, the iron elements lying in 3-dimensional space, each iron element including:

a permanent magnet fixed to the working surface, and iron powder covering the permanent magnet, the permanent magnets generating a first working magnetic field about the working surface, said first working magnetic field determining an initial position and orientation of the iron elements with respect to the working surface;

(c) an electromagnet adjacent the working surface for selectively generating a second magnetic field, the second magnetic field perturbing the first working magnetic field changing the shape of the iron elements on the working surface; and (d) computer means coupled to the electromagnet for controlling strength of the second magnetic field, the computer means programmed to provide signals for changing the strength of the second magnetic field in a manner that the second magnetic field controllably perturbs the first working magnetic field changing the respective shapes of the iron elements according to a desired temporal and physical 3-dimensional spatial pattern of the iron elements collectively, said pattern including various geometrical shapes.

8. A 3-D amusement and display device comprising:

a working medium formed of a region of 3-dimensional space and including (a) a first working magnetic field generated by a permanent magnet, and (b) a second working magnetic field generated by at least one electromagnet;

a working surface positioned in the working medium;

a multiplicity of repositionable elements repositionable in the working medium for forming physical 3-dimensional arrangements thereof in the working medium, the repositionable elements comprising magnetic material and lying on the working surface; and computer means coupled to the electromagnet generating the second working magnetic field, the computer means for providing a temporal and spatial series of physical 3-dimensional arrangements of the elements in the working medium including various geometrical shapes, the temporal and spatial series of physical 3-dimensional arrangements of the elements being the change in at least one of position and shape of elements in the working medium from one physical 3-D arrangement of the elements to another physical 3-D arrangement of the elements in a desired time sequence, the computer means changing position and orientation of the elements on the working surface by providing signals for perturbing the first working magnetic field with the second working magnetic field, the signals controlling strength of the second working magnetic field.

9. A device as claimed in claim 8 wherein the computer means includes a specification of the series of the physically 3-dimensional arrangements of elements.

10. A device as claimed in claim 8 wherein the temporal and spatial series is established according to operation of an input device coupled to the computer means.

11. A device as claimed in claim 8 wherein the working medium and elements are formed of respective materials which substantially eliminate noise.

12. A device as claimed in claim 8 further comprising:

a computer routine executable by the computer means for substantially equally distributing the elements over the working surface.

13. A device as claimed in claim 8 wherein each element is able to quickly change position and orientation in the working medium without apparent vibration.

14. A device as claimed in claim 8 wherein the elements change position and orientation in response time of about 1/30 second to about ½ second.

15. A 3-D amusement and display device comprising:

a working medium formed of a volume of liquid contained in a container, the working medium physically having three dimensions;

a multiplicity of repositionable elements coupled to the container and repositionable in relation to each other in 3-dimensional space along horizontal and vertical axes in the volume of liquid for forming physical and truly 3-dimensional arrangements of the repositionable elements in the working medium resulting in truly 3-dimensional images, the repositionable elements comprising gas bubbles generated in the container; and bubble generation means coupled to the container for generating gas bubbles in the container; and computer means coupled to the bubble generation means for providing a temporal and spatial series of physical 3-dimensional arrangements of the elements in the working medium including various geometrical shapes, the temporal and spatial series being the change of at least one of position and shape of the elements in the working medium from one physical 3-D arrangement of the elements to another physical 3-D arrangement of the elements in a desired time sequence, the computer means controlling the bubble generation means to generate gas bubbles in the container, in a temporal and spatial pattern as desired, the temporal and spatial series of physical 3-dimensional arrangements of elements being formed in the working medium.

16. A device as claimed in claim 15 wherein each gas bubble travels a substantially straight path independent of apparent turbulence.

17. A device as claimed in claim 15 wherein the bubble generation means includes:

a source of pressurized gas; and a plurality of valves connected between the container and the source of pressurized gas for delivering gas from the source into the container, each valve being controlled by the computer means for selectively generating gas bubbles of different desired sizes in the container.

18. A device as claimed in claim 17 wherein the valves are check valves.

19. A device as claimed in claim 18 further including a plurality of 3-way fast response valves, each connected between a different check valve and a source of pressurized gas.

20. A device as claimed in claim 19 wherein the temporal and spatial pattern is established in real time according to viewer operation of an input device coupled to the computer means.

21. A device as claimed in claim 20 wherein the input device is a keyboard.

22. A 3-D amusement and display device comprising:

a working medium formed of a volume of liquid contained in a container, the working medium physically having three dimensions;

a multiplicity of repositionable elements coupled to the container and repositionable in the volume of liquid for forming physical 3-dimensional arrangements thereof in the working medium, the repositionable elements comprising gas bubbles generatable in the container, wherein each gas bubble travels a substantially straight path independent of apparent turbulence;

bubble generation means coupled to the container for generating gas bubbles in the container; and computer means coupled to the bubble generation means for providing a temporal and spatial series of physical 3-dimensional arrangements of the elements in the working medium including various geometrical shapes, the temporal and spatial series being the change of at least one of position and shape of the elements in the working medium from one physical 3-D arrangement of the elements to another physical 3-D arrangement of the elements in a desired time sequence, the computer means controlling the bubble generation means to generate gas bubbles in the container, in a temporal and spatial pattern as desired, the temporal and spatial series of physical 3-dimensional arrangements of elements formed in the working medium.

* * * * *

UNITED STATES PATENT AND TRADEMARK OFFICE

CERTIFICATE OF CORRECTION

PATENT NO. : 5,276,609

DATED : January 4, 1994

INVENTOR(S) : David M. Durlach

It is certified that error appears in the above-indentified patent and that said Letters Patent is hereby corrected as shown below:

Column 9, Claim 10, line 7 of that claim before "is" change "series" to read --pattern--.

Signed and Sealed this

Nineteenth Day of July, 1994

Attest:

BRUCE LEHMAN

Attesting Officer

*Commissioner of Patents and Trademarks*